(12) United States Patent
Wold et al.

(10) Patent No.: US 11,548,469 B2
(45) Date of Patent: Jan. 10, 2023

(54) INFLATABLE CURTAIN AIRBAG

(71) Applicant: AUTOLIV ASP, INC., Ogden, UT (US)

(72) Inventors: Dana Joseph Wold, Farmington Hills, MI (US); Joseph Scott Massa, Rochester Hills, MI (US); Matthew Robert Reschke, Royal Oak, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 17/230,722

(22) Filed: Apr. 14, 2021

(65) Prior Publication Data
US 2022/0332275 A1 Oct. 20, 2022

(51) Int. Cl.
*B60R 21/232* (2011.01)
*B60R 21/237* (2006.01)
*B60R 21/213* (2011.01)

(52) U.S. Cl.
CPC .......... *B60R 21/232* (2013.01); *B60R 21/213* (2013.01); *B60R 21/237* (2013.01)

(58) Field of Classification Search
CPC ... B60R 21/213; B60R 21/232; B60R 21/235; B60R 21/237; B60R 2021/23509; B60R 2021/23514
See application file for complete search history.

(56) References Cited

U.S. PATENT DOCUMENTS

| | | | | |
|---|---|---|---|---|
| 2,595,833 A | * | 5/1952 | Flaherty | B60J 1/2011 160/354 |
| 3,670,798 A | * | 6/1972 | Hess | B60J 1/2011 160/354 |
| 4,442,881 A | * | 4/1984 | Monteath | B60J 1/2038 160/DIG. 3 |
| 4,497,515 A | * | 2/1985 | Appelson | B60J 1/2041 296/141 |
| 4,531,560 A | * | 7/1985 | Balanky | B60J 11/06 296/136.03 |
| 4,989,525 A | * | 2/1991 | Portilla | D05B 23/00 112/155 |
| 5,984,405 A | * | 11/1999 | Ciacci | B60J 7/11 160/354 |
| 6,808,199 B2 | * | 10/2004 | Saderholm | B60R 21/201 280/730.2 |
| 6,902,187 B2 | * | 6/2005 | Sonnenberg | B60R 21/2176 280/730.2 |

(Continued)

*Primary Examiner* — Laura Freedman
(74) *Attorney, Agent, or Firm* — Dickinson Wright PLLC

(57) ABSTRACT

An inflatable curtain device for protecting occupants in a motor vehicle includes an inflatable curtain adapted to be folded or rolled in an undeployed condition and inflated in a deployed condition, and the inflatable curtain is formed from at least a first and a second fabric layer. The inflatable curtain device further includes at least one portion of one of the first and second fabric layers having a permanent magnet region, which is magnetically attracted to at least one of a second region of the vehicle or a second region of one of the first and second fabric layers thereby provides a retention of the inflatable curtain in a folded or rolled configuration in an installation position with the vehicle and retains the inflatable curtain in the rolled or folded configuration.

9 Claims, 11 Drawing Sheets

(56) References Cited

U.S. PATENT DOCUMENTS

| | | | | |
|---|---|---|---|---|
| 8,365,799 B2* | 2/2013 | Harris | .................... | H01F 7/0252 |
| | | | | 160/370.21 |
| 9,862,347 B2* | 1/2018 | Deng | .................... | B60R 21/205 |
| 10,023,145 B1* | 7/2018 | Rivera | .................. | B60R 21/214 |
| 10,300,880 B2* | 5/2019 | Mihm | ..................... | B60R 21/16 |
| 11,192,506 B2* | 12/2021 | Sekizuka | ................. | B60N 2/91 |
| 11,220,226 B2* | 1/2022 | Forgette | ............. | B60R 13/0225 |
| 2003/0015862 A1* | 1/2003 | Jost | ....................... | B60R 21/232 |
| | | | | 280/730.2 |
| 2009/0195014 A1* | 8/2009 | Gathman | ................ | B60R 21/06 |
| | | | | 296/152 |
| 2016/0082917 A1* | 3/2016 | Slaats | .................. | B60R 21/232 |
| | | | | 280/730.2 |
| 2016/0236636 A1* | 8/2016 | Rao | ....................... | B60R 21/235 |
| 2020/0047700 A1* | 2/2020 | Santin Navarro | ...... | B60R 21/20 |
| 2020/0331424 A1* | 10/2020 | Cord | ...................... | B60R 21/36 |

* cited by examiner

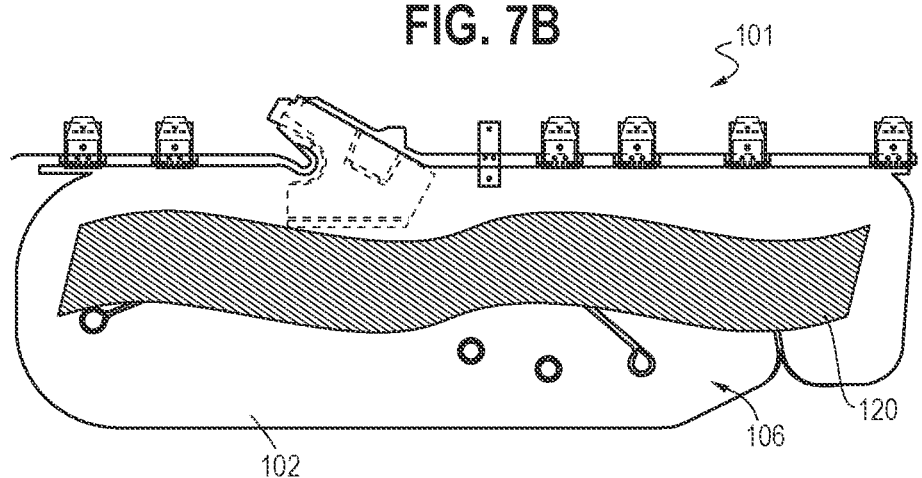
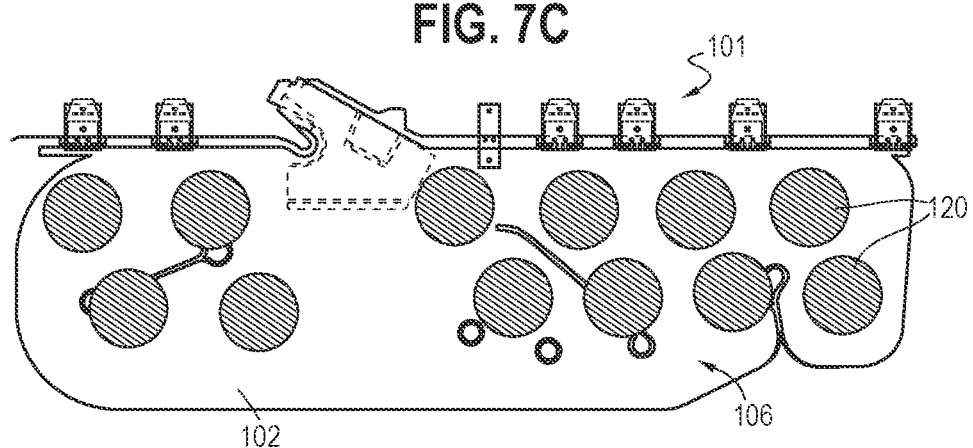
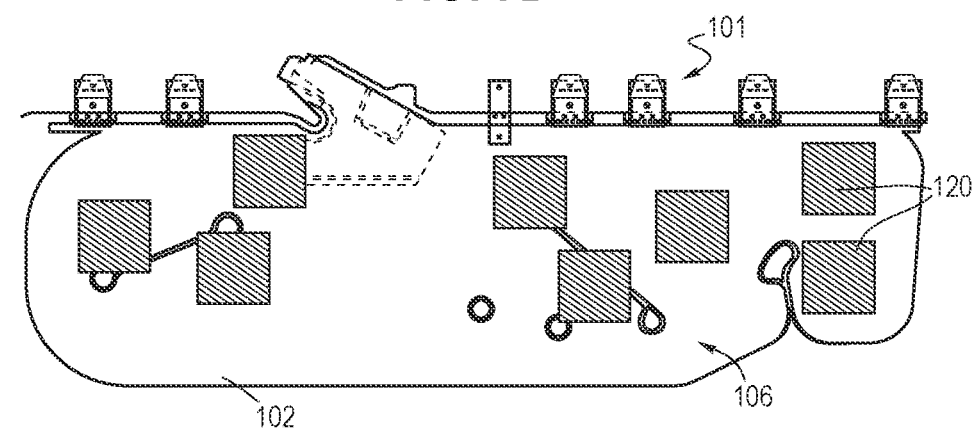

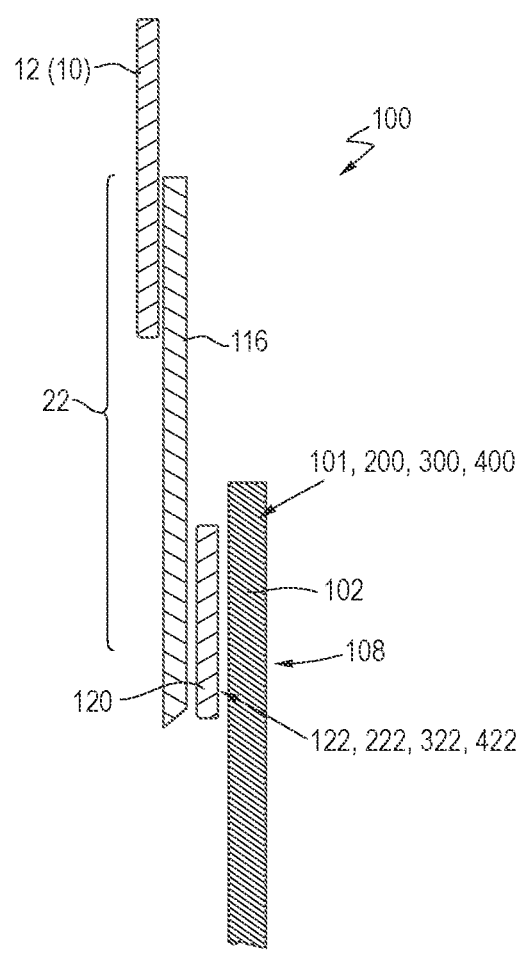

INFLATABLE CURTAIN AIRBAG

TECHNICAL FIELD

This present disclosure relates to an occupant protection device in a vehicle. In particular, the present disclosure relates to an inflatable curtain device installed in an interior of the vehicle for protecting the occupants.

BACKGROUND

The statements in this section merely provide background information related to the present disclosure and may not constitute prior art.

Airbag systems including front airbags and curtain airbags as a safety restraint device are mandatory in motor vehicles sold throughout the world. In the event of a vehicle impact or rollover event, inflators coupled with each airbag are triggered and deploy the airbags respectively according to the impact direction of the vehicle. In particular, the curtain airbags have also been developed in response to the need for passenger protection from lateral impacts with the side of the vehicle, in particular the head and upper torso of the occupant. Generally, the curtain airbag in a normal undeployed condition is stowed along a side roof rail of the vehicle and generally conforms to the shape of the window area or side of the vehicle interior. Accordingly, the inflatable curtain extends downwardly in a substantially curtain-like fashion between the occupant and the side portions of the vehicle when deployed.

Inflatable curtain airbags are typically installed adjacent to the roof rail of a vehicle in an undeployed condition, in which the inflatable curtain airbag is rolled or folded or a combination thereof and retained in the folded or rolled configuration by being wrapped at certain points along the curtain airbag as an installation position with the vehicle. When deployed, the inflatable curtain exits from the installation position and extends downwardly to a deployed condition providing an energy absorbing barrier for the occupant head and shoulder regions. In addition, a curtain airbag mounting apparatus typically allows for a secure connection between the vehicle and the airbag, yet allows the airbag to change its configurations from the undeployed condition to the deployed condition.

In the undeployed condition of the inflatable curtain airbag, as described above, the inflatable curtain is generally wrapped by a separate component or wrapper for allowing the inflatable curtain to efficiently deploy and also retain the inflatable curtain in a desired configuration of the undeployed state. It is preferred that the inflatable curtain stays snugged up against the roof rail of the vehicle due to the limited interior space of the passenger compartment in the vehicle so that the installed inflatable curtain in the rolled or folded configuration does not sag and push the headliner down in the undeployed condition.

SUMMARY

The present disclosure relates to an inflatable curtain assembly for protecting occupants in a motor vehicle from lateral impacts with the side of the vehicle. In accordance with an aspect of the present disclosure, an inflatable curtain device includes an inflatable curtain adapted to be folded or rolled in an undeployed condition and inflated in a deployed condition, and the inflated curtain is formed from at least a first and second fabric layers. The inflatable curtain device includes at least one portion of one of the first and second fabric layers having a permanent magnet region, which is magnetically attracted to a second region of the vehicle thereby provides a retention of the inflatable curtain in the folded or rolled configuration in an installation position with the vehicle.

In accordance with a further aspect of the present disclosure, the permanent magnet region is formed by a particle layer, which is magnetized to attach to the second region of the vehicle. In addition, the permanent magnet region is located adjacent to an upper portion of the inflatable curtain such that the permanent magnet region is close to the second region of the vehicle, which is a roof rail along sides of a body of the vehicle.

In accordance with a further aspect of the present disclosure, the particle layer includes an upper particle edge arranged in a line with an upper edge of the inflatable curtain and a lower particle edge extending from the upper particle edge. The particle layer formed as at least one continuous single strip is attached to one of the first and second fabric layers of the inflatable curtain as the permanent magnet region. The at least one continuous single strip of the particle layer is provided with a curved form or a diagonal form.

In accordance with a further aspect of the present disclosure, the particle layers are separately attached to one of the first and second fabric layers of the inflatable curtain in a regular or irregular pattern to form the permanent magnet regions. The permanent magnet regions formed by the particle layers are provided with various patterns such as a polka dot pattern or multiple rectangular pattern.

In accordance with a further aspect of the present disclosure, the particle layer is formed by a magnetic material component, which is attached to one of the first and second fabric layers of the inflatable curtain.

In accordance with another aspect of the present disclosure, an inflatable curtain device for protecting occupants in a motor vehicle includes an inflatable curtain adapted to be folded or rolled in an undeployed condition and inflated in a deployed condition, and the inflatable curtain is formed from at least a first and a second fabric layers. The inflatable curtain device further includes at least one portion of one of the first and second fabric layers having a first permanent magnet region and a second region of the first or the second fabric layer positioned to attract the first permanent magnet region when the inflatable curtain is in a rolled or folded configuration. The first permanent magnet region attracted to the second region provides a retention of the inflatable curtain in the rolled or folded configuration.

In accordance with a further aspect of the present disclosure, the first permanent magnet region on the inflatable curtain prevents the inflatable curtain from sagging in the undeployed condition such that the first permanent magnet region is configured to maintain the rolled or folded configuration of the inflatable curtain in an installation position with the vehicle. In addition, the first permanent magnet region is formed by a particle layer having an upper particle edge arranged in a line with an upper edge of the inflatable curtain and a lower particle edge extending from the upper particle edge. The lower particle edge of the particle layer is arranged in a line with a lower edge of the inflatable curtain such that the entire surface of one of the first or second fabric layers of the inflatable curtain is substantially fully covered by the first permanent magnet region.

In accordance with a further aspect of the present disclosure, the particle layer having the extended lower particle edge substantially covers a part of a surface of one of the first and second fabric layers of the inflatable curtain, which defines a partly-covered area. In the rolled configuration of the inflatable curtain, the first permanent magnet region defined as the partly-covered area is located in an outer-most layer and a couple of layers inwardly adjacent to the outer-most layer. In the rolled and folded configuration of the inflatable curtain, the first permanent magnet region defined as the partly-covered area is located in a rolled portion enclosing a folded portion of the inflatable curtain.

In accordance with a further aspect of the present disclosure, the first permanent magnet regions are formed by the particle layers separately attached to the at least one portion of one of the first or second fabric layers of the inflatable curtain. In the folded configuration of the inflatable curtain, the first permanent magnet regions separately arranged in the one of the first or second fabric layers attract each other for retaining the folded inflatable curtain.

In accordance with another aspect of the present disclosure, an inflatable curtain device includes an inflatable curtain adapted to be folded or rolled in an undeployed condition and inflated in a deployed condition, and the inflatable curtain is formed from at least a first and second fabric layer. The inflatable curtain device further includes at least one portion of one of the first and second fabric layers having a permanent magnet region, which is magnetically attracted to at least one of a second region of the vehicle or a second region of one of the first and second fabric layers thereby provides a retention of the inflatable curtain in a folded or rolled configuration in an installation position with the vehicle and retains the inflatable curtain in the rolled or folded configuration.

In the present disclosure, the function of the particle layer having the magnetic component material retains the inflatable curtain in the rolled or folded configuration without an extra component or wrapper thereby securely installing the magnetized inflatable curtain within the limited space of the vehicle interior. The magnetized inflatable curtain is also configured to prevent the inflatable curtain device from sagging and pushing the headliner of the vehicle down. Accordingly, due to the reduced extra components, it reduces cost and weight when the magnetized inflatable curtain of the present disclosure is installed into the frame of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 7B is a side view of the inflatable curtain having the magnetized particle layer with a curved pattern of FIG. 4; FIG. 7C is a side view of the inflatable curtain having the magnetized particle layer arranged in a regular pattern; and FIG. 7D is a side view of the inflatable curtain having the magnetized particle layer arranged in an irregular pattern; and FIG. 8 is a detailed cross-section view of an inflatable curtain device having a magnetized particle layer attached to a vehicle interior in accordance with an embodiment of the present disclosure.

Figure 1A:
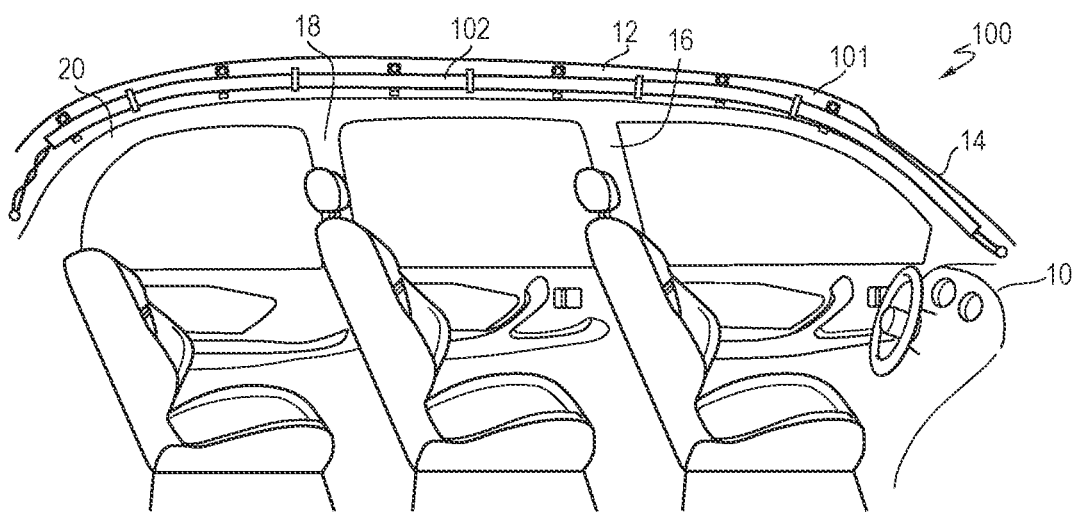
FIGS. 1A and 1B are side views from an interior of a vehicle of an inflatable curtain assembly in an undeployed condition and a deployed condition in accordance with an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1A, one embodiment of an inflatable curtain (i.e., airbag) assembly 100 for protecting occupants in a motor vehicle 10 is provided. The inflatable curtain device 101 is mounted adjacent to a roof rail 12 inside the vehicle 10 and longitudinally extends from an A-pillar 14 to a D-pillar 20 along sides of a body of the vehicle 10 such that the inflatable curtain device 101 extends past a B-pillar 16 and a C-pillar 18 in the longitudinal direction of the vehicle 10. As shown in FIG. 1A, accordingly, the inflatable curtain device 101 mounted to the roof rail 12 of the vehicle 10 is generally used to protect the occupants of the vehicle during a side collision or roll-over event.

Figure 1B:
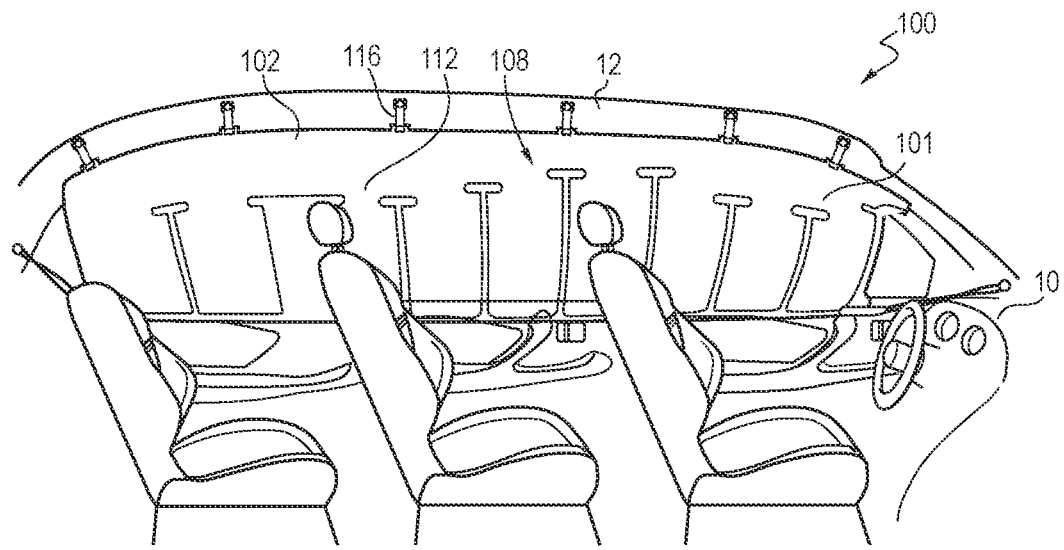

FIG. 1A provides a perspective view of the inflatable curtain device 101 mounted to the roof rail 12 of the vehicle 10 and the inflatable curtain 102 is in an undeployed condition as an installation position with the vehicle 10. In FIG. 1B, the inflatable curtain 102 becomes inflated upon activation of one or more inflators (not shown) in a collision scenario of the vehicle 10 such that the inflatable curtain 102 expands downwardly along the side of the vehicle 10 between the occupants and the side structure of the vehicle 10, which is defined as a deployed condition. In the deployed condition of the inflatable curtain 102, the inflatable curtain 102 covers at least a portion of side windows and the side-pillars of the vehicle 10. For example, as shown in FIG. 1B, the inflatable curtain 102 covers the A-pillar 14 to D-pillar 20 including the side windows of the vehicle 10 along the roof rail 12 of the vehicle 10.

Figure 2:
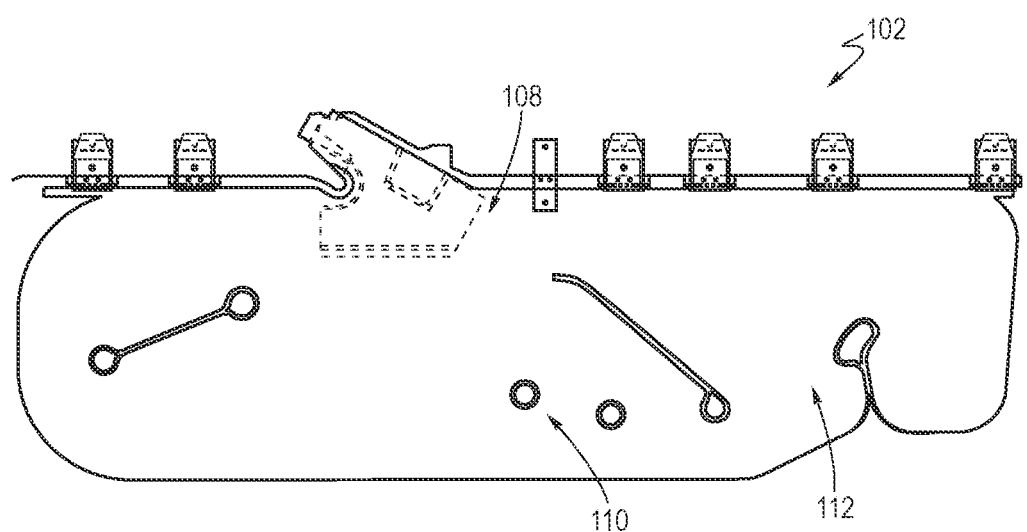
FIG. 2 shows a side view of an inflatable curtain in the deployed condition of FIG. 1B.

As shown in FIGS. 1A and 1B, the inflatable curtain 102 transitions from the undeployed condition to the deployed condition. Upon activation, the inflator(s) (not shown) rapidly generates and/or releases inflation gas, which rapidly inflates the inflatable curtain 102. FIG. 1B is a perspective view of the deployed inflatable curtain 102 in the interior of the vehicle 10. The inflatable curtain 102 is formed with at least two fabric layers such as a first fabric layer 104 and a second fabric layer 106 (see FIG. 3), which are coupled together at a seam or opposing sides that are woven as one-piece. In addition, FIG. 2 shows the inflatable curtain 102 depicted in the deployed condition. In FIG. 2, the inflatable curtain 102 is described as having an upper portion 108, a lower portion 110, an inboard-facing surface 112 on the first fabric layer 104, and an outboard-facing surface (not visible) on the second fabric layer 106.

As shown in FIG. 2, the upper portion 108 of the inflatable curtain 102 is the portion of the curtain 102 that is closest to the roof rail 12 of the vehicle 10 and the lower portion 110 of the inflatable curtain 102 extends from the upper portions 108 in the deployed condition. In addition, as shown in FIG. 1A, the inflatable curtain 102 is typically installed adjacent to the roof rail 12 of the vehicle 10 in the undeployed condition, in which the inflatable curtain 102 is rolled or folded, or a combination thereof, and retained in the rolled or folded configuration by being wrapped at certain points along the inflatable curtain 102. Upon activation, the inflator (not shown) rapidly generates and/or releases inflation gas, which rapidly inflates the inflatable curtain 102. The inflator is one of several types, such as pyrotechnic, stored gas, or a combination inflator, and comprises a single or multistage inflator. When extended and inflated, curtain attachment members 116 attached to the roof rail 12 of the vehicle 10 typically allow for a secure connection between the vehicle 10 and the inflatable curtain 102, yet allow the curtain 102 to change its condition from the undeployed condition to the deployed condition.

Figure 3:
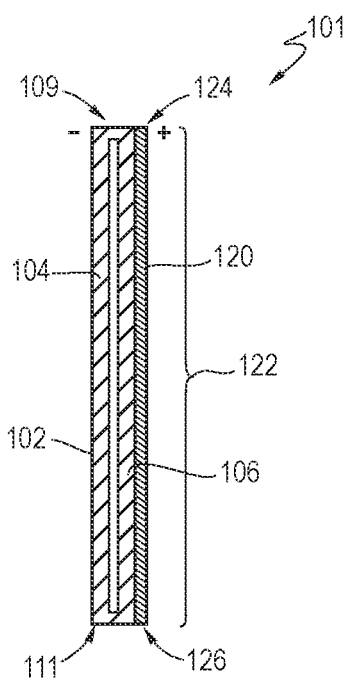
FIG. 3 shows an end view of the inflatable curtain having a magnetized particle layer on a second fabric layer of FIG. 2.

In the undeployed condition, the inflatable curtain 102 stored in a rolled or folded state is mounted to the roof rail 12 of the vehicle 10 through the curtain attachment member 116. Generally, when the inflatable curtain in a conventional side airbag assembly is stored in the undeployed condition, separate wrappers or components wrap around the rolled or folded inflatable curtain and are coupled to the curtain attachment member 116. In accordance with an exemplary embodiment of the present disclosure, FIG. 3 illustrates a longitudinal end view of the inflatable curtain 102 along the roof rail 12 of the vehicle 10. The inflatable curtain 102 includes the first and second fabric layers 104 and 106. In addition, the inflatable curtain 102 further includes a particle layer 120, which is attached to one of the first and second fabric layers 104 and 106. As shown in FIG. 3, for example, the particle layer 120 is attached to the second fabric layer 106, but the particle layer 120 is also attached to the first fabric layer 104 (see FIG. 3B) or both first and second fabric layers 104 and 106 (see FIG. 3C), which is defined as a permanent magnet region 122 in the inflatable curtain 102. The particle layer 120 is attached to one of the first and second fabric layers 104 and 106 by using adhesive materials or the particle layer 120 is sewn in or applied on one of the first and second fabric layers 104 and 106 such as a silk screening method. As the permanent magnet region 122 defined in the inflatable curtain 102, the particle layer 120 is generally made of materials having magnetic components such as the property of having poles or being polar.

Due to the attached particle layer 120 having the permanent magnet region 122, the inflatable curtain 102 exhibits polarity. As shown in FIG. 3, for example, the second fabric layer side has a positive (+) polarity and the first fabric layer side has a negative (−) polarity. In accordance with other embodiments of the present disclosure, however, the polarity could be switched (see FIG. 4A). In FIG. 4A, the inflatable curtain 102 having the permanent magnetic region 222 attached to the second fabric layer 106 exhibits polarity, and the second fabric layer side has a negative (−) polarity and the first fabric layer side has a positive (+) polarity.

As shown in FIG. 3, for example, the particle layer 120 is attached to the second fabric layer 106 of the inflatable curtain 102. However, as described above, the particle layer 120 may be attached on the first fabric layer 104 of the inflatable curtain 102 (see FIG. 3B). In the deployed condition of the inflatable curtain 102, the particle layer 120 includes an upper particle edge 124 aligned with an upper edge 109 of the inflatable curtain 102 and a lower particle edge 126 extending from the upper particle edge 124. In FIG. 3, the lower particle edge 126 is aligned with a lower edge 111 of the inflatable curtain 102. Accordingly, as shown in FIG. 3, the particle layer 120 fully covers the entire surface of the second fabric layer 106 such that the inflatable curtain 102 coated by the particle layer 120 itself acts as a magnet.

Figure 3A:
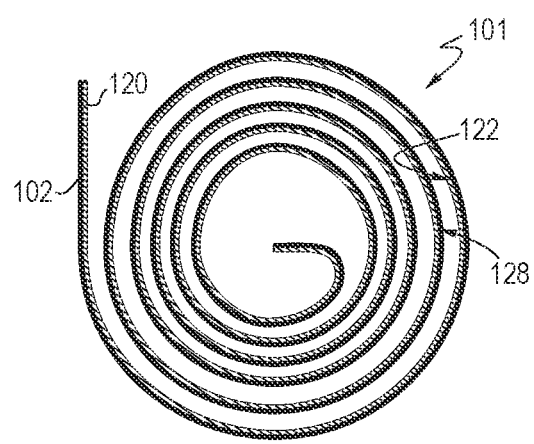
FIG. 3A shows the inflatable curtain having the magnetized particle layer in a rolled configuration of FIG. 3.
Figure 3B:
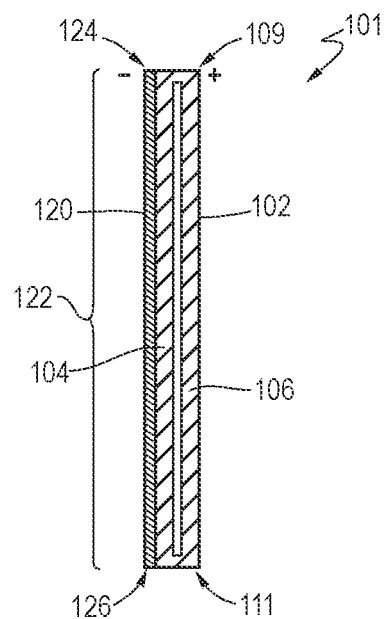
FIG. 3B shows an end view of the inflatable curtain having a magnetized particle layer on a first fabric layer of FIG. 2.
Figure 3C:
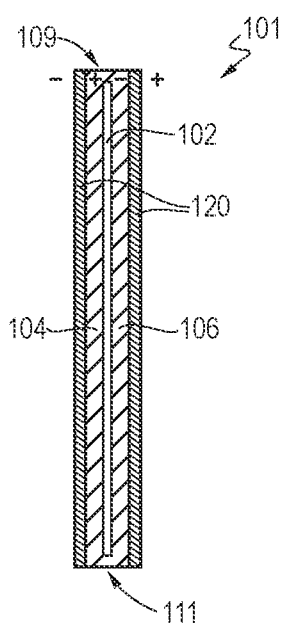
FIG. 3C shows an end view of the inflatable curtain having a magnetized layer on the first and second fabric layers of FIG. 2.

FIG. 3A illustrates an end view of the inflatable curtain device 101 in the rolled configuration. In the undeployed condition, the rolled-up inflatable curtain device 101 is stored as an installation position with the vehicle 10 and attached to the roof rail 12 of the vehicle 10. As shown in FIG. 3A, the magnetized inflatable curtain 102 coated by the particle layer 120 maintains its rolled configuration without the use of the separate wrapper or component. The inflatable curtain device 101 having the magnetized inflatable curtain 102 allows the inflatable curtain device 101 to place inside the roof rail 12 in its compact condition and also prevents the inflatable curtain device 101 from sagging when the inflatable curtain device 101 is installed into the roof rail 12 of the vehicle 10 such that the magnetized inflatable curtain 102 is itself retained in the undeployed condition.

According to the present disclosure, one of the first and second fabric layers 104 and 106 of the inflatable curtain 102 is magnetized with the particle layer 120, and the magnetized area of the inflatable curtain 102 is defined as the permanent magnet region 122. The magnetized surface defined as the permanent magnet region 122 attracts another magnetized region having the opposite polarity, which is defined as a second region 128 in the undeployed condition. In FIGS. 3 and 3A, the entire surface of the second fabric layer 106 is magnetized by the particle layer 120 such that the entire surface of the magnetized surface of the second fabric layer 106 is defined as the permanent magnet region 122. Accordingly, in FIG. 3A, when the inflatable curtain device 101 is rolled up and stored in the rolled configuration in the installation position with the vehicle 10, the second region 128 of the inflatable curtain 102 contacts the permanent magnet region 122 and magnetically attracts the permanent magnet region 122. The first permanent magnet region 122 attracted to the second region 128 provides a retention of the inflatable curtain 102 in the rolled configuration such that the inflatable curtain device 101 is configured to prevent the inflatable curtain 102 from sagging in the undeployed condition. In accordance with other embodiments of the present disclosure, the first fabric layer 104 may be magnetized by the particle layers 120 and the surface of the magnetized first fabric layer 104 is defined as the permanent magnet region 122 (see FIG. 3B).

Figure 4:
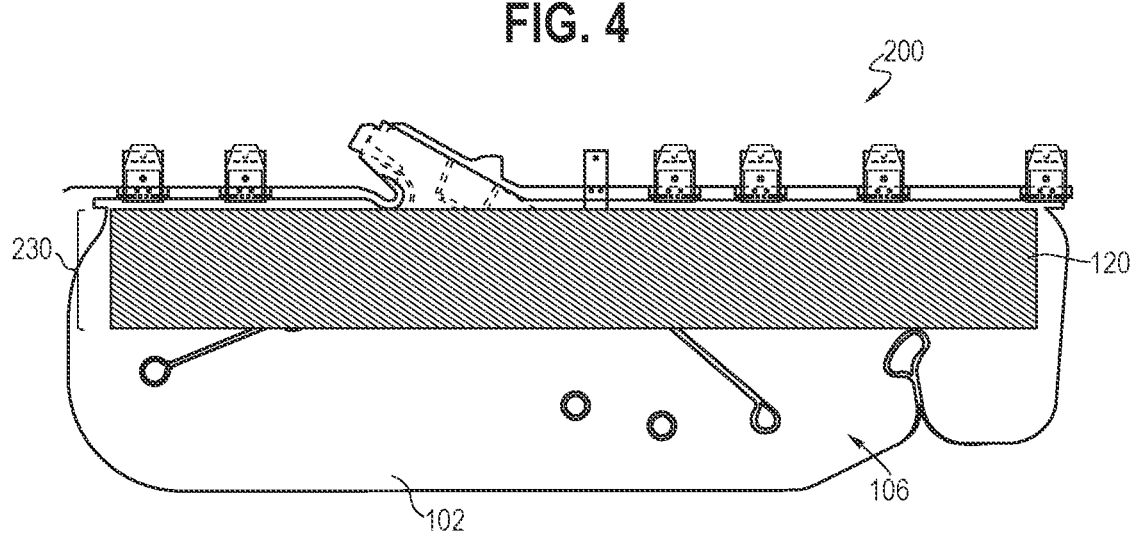
FIG. 4 shows a side view of an inflatable curtain having a partly magnetized particle layer in accordance with another embodiment of the present disclosure.
Figure 4A:
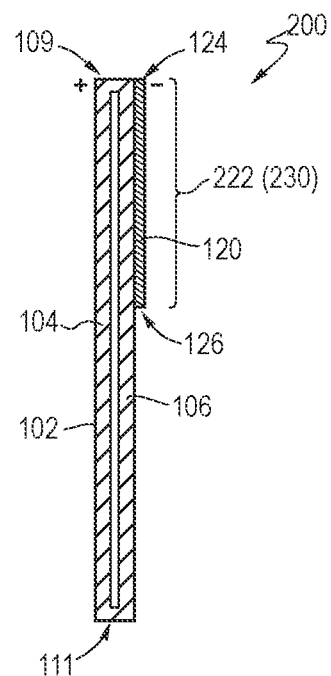
FIG. 4A shows an end view of the inflatable curtain having the partly magnetized particle layer of FIG. 4.

FIGS. 4 and 4A illustrate an inflatable curtain device 200 in accordance with another embodiment of the present disclosure. In FIGS. 4 and 4A, the inflatable curtain device 200 includes the particle layer 120 attached to a part of the surface of the second fabric layer 106 such that the particle layer 120 partly or locally covers the surface of the second fabric layer 106. Also, in accordance with other embodiments of the present disclosure, the particle layer 120 may cover the part of the surface of the first fabric layer 104 of the inflatable curtain 102. In FIG. 4, a permanent magnet region 222 of the inflatable curtain 102 is defined as a partly-covered area 230, which is magnetized by the particle layer 120 partly covering the surface of one of the first and second fabric layers 104 and 106. Accordingly, the upper particle edge 124 of the particle layer 120 is aligned with the upper edge 109 of the inflatable curtain 102 and the lower particle edge 126 extends to magnetize the partly-covered area 230 defined as the permanent magnet region 222 in the deployed condition of the inflatable curtain 102.

Figure 4B:
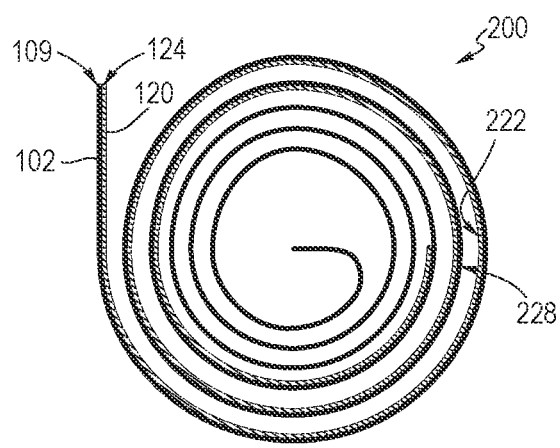
FIG. 4B shows the inflatable curtain having the partly magnetized particle layer in a rolled configuration of FIG. 4.
Figure 4C:
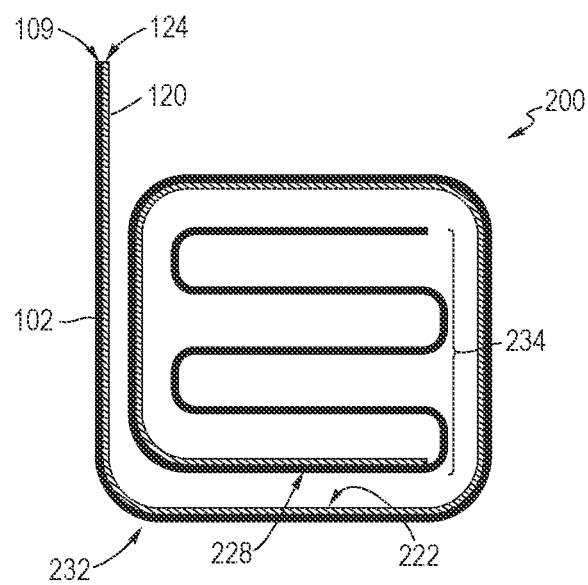
FIG. 4C shows the inflatable curtain having the partly magnetized particle layer in a rolled and folded configuration of FIG. 4.

FIGS. 4B and 4C illustrate an end view of the inflatable curtain devices 200 in the undeployed condition along the roof rail 12 of the vehicle 10. FIG. 4B shows the inflatable curtain device 200 in a rolled configuration and FIG. 4C shows the inflatable curtain device 200 in a combined configuration having both rolled and folded portions of the inflatable curtain 102. As shown in FIGS. 4B and 4C, the inflatable curtain device 200 includes the permanent magnet region 222 magnetized by the particle layer 120 and a second region 228 contacting the permanent magnet region 222. In the rolled configuration of the inflatable curtain device 200 of FIG. 4B, the permanent magnet region 222 defined by the partly-covered area 230 (see FIGS. 4 and 4A) is positioned at an outer-most layer and a couple of layers inwardly adjacent to the outer-most layer. Also, in the combined configuration of the inflatable curtain device 200 of FIG. 4C, the permanent magnet region 222 defined by the partly-covered area 230 (see FIGS. 4 and 4A) is positioned in the rolled portion 232 enclosing the folded portion 234 of the inflatable curtain 102. Accordingly, the inflatable curtain device 200 having the permanent magnet region 222 itself maintains the rolled and/or folded configuration without the use of a separate wrapper due to the inflatable curtain 102 magnetized by the particle layer 120. In addition, the permanent magnet region 222 attracted to the second region 228 in the rolled and/or folded configuration of the inflatable curtain device 200 provides a retention of the inflatable curtain 102 such that it prevents the inflatable curtain 102 from sagging in the installation position with the vehicle 10.

Figure 5:
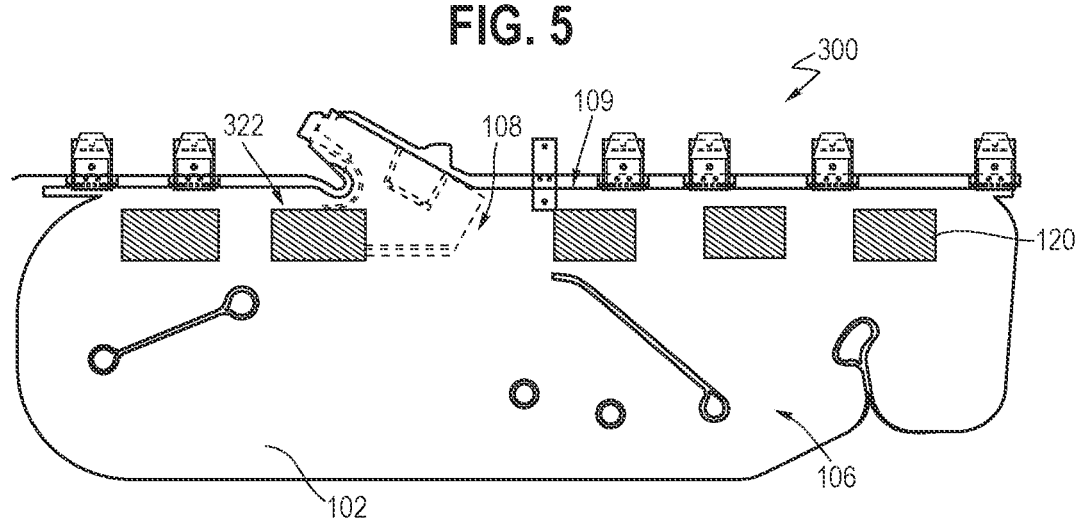
FIG. 5 is a side view of an inflatable curtain having a partly magnetized particle layer in multiple locations in accordance with another embodiment of the present disclosure, and FIG. 5A a side view of the inflatable curtain having the partly magnetized particle layer in different locations of FIG. 5.
Figure 5A:
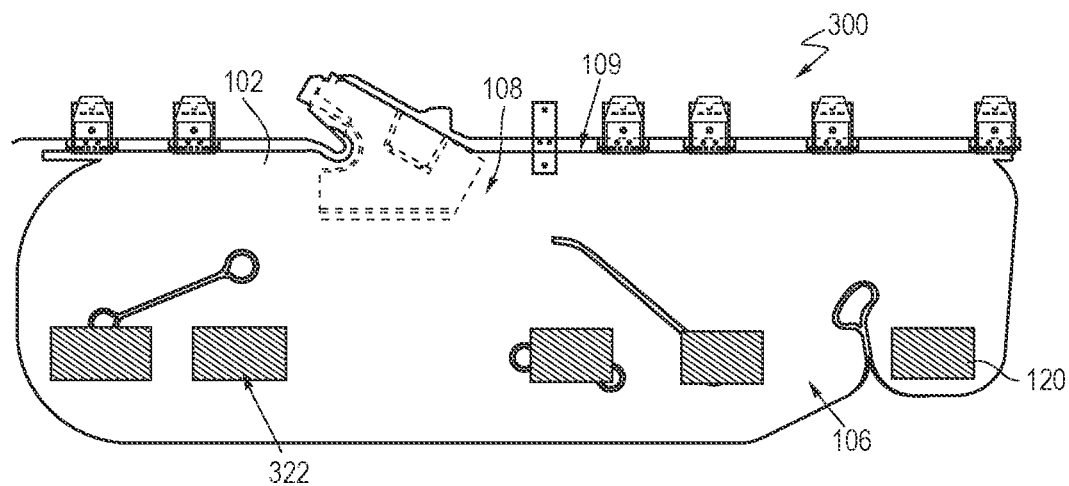

FIG. 5 illustrates an inflatable curtain device 300 having the particle layers 120 selectively applied to one of the first and second fabric layers 104 and 106 of the inflatable curtain 102. As shown in FIG. 5, the permanent magnet regions 322 defined by the particle layers 120 are separately positioned in multiple locations in the upper portion 108 of the inflatable curtain 102 along the upper edge 109 of the inflatable curtain 102. In the installation position of the inflatable curtain device 300, as described above, the permanent magnet regions 322 are also attracted to the second regions having the opposite polarity so that the permanent magnet regions 322 provide a retention of the inflatable curtain 102 in the rolled and/or folded configuration. Also, as shown in FIG. 5A of the present disclosure, the permanent magnet regions 322 are positioned in the different areas (for example, the lower portion 110 of the deployed inflatable curtain 102) such that in the installation position of the inflatable curtain 102, the permanent magnet regions 322 attract the second regions and provide a retention of the inflatable curtain 102. As shown in the example of FIGS. 5-5A, accordingly, the permanent magnet regions 322 locally and separately attached to the first and/or second fabric layers are used to retain entirely or partially the inflatable curtain 102 in the installation position such that the permanent magnet regions 322 can be used to partially retain the inflatable curtain 102 as mini-wrappers or a tape in the installation position of the inflatable curtain 102.

Figure 6:
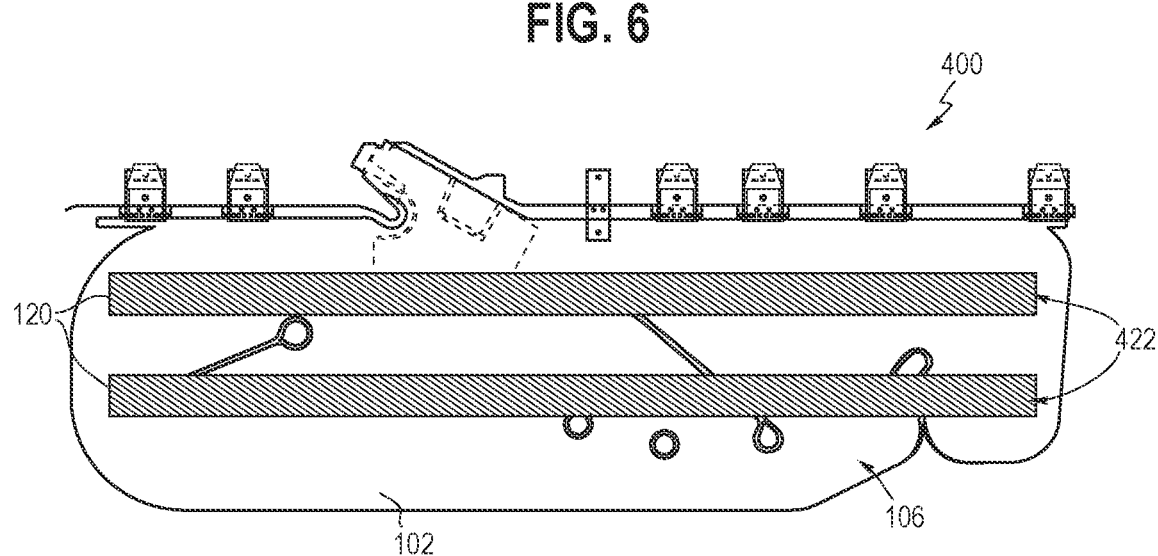
FIG. 6 is a side view of an inflatable curtain having two separate magnetized particle layers in accordance with another embodiment of the present disclosure.

In accordance with another embodiment of the present disclosure, FIG. 6 illustrates an inflatable curtain device 400 having at least one particle layers 120 selectively applied to one of the first and second fabric layers 104 and 106 of the inflatable curtain 102. For example, in FIG. 6, two particle layers 120 are selectively attached to the second fabric layer 106 and are arranged in parallel as two single continuous strips longitudinally along the roof rail 12 of the vehicle 10 such that the permanent magnet regions 422 defined by the two particle layers 120 are separately positioned in the inflatable curtain 102. Also, two particle layers 120 are each attached to the first and second fabric layers 104 and 106 respectively (not shown) in accordance with other embodiments of the present disclosure.

Figure 6A:
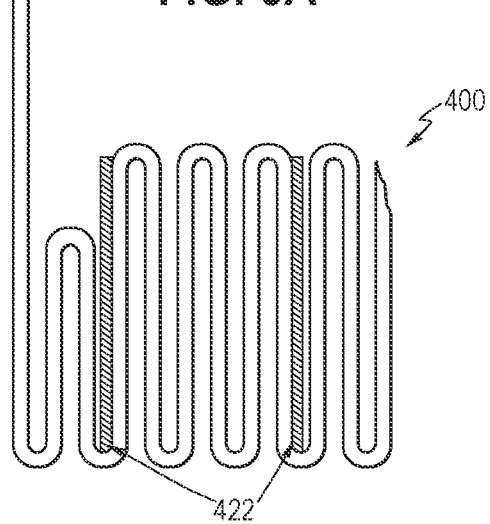
FIG. 6A shows the inflatable curtain having the two separate magnetized particle layers in a folded configuration of FIG. 6.
Figure 7:
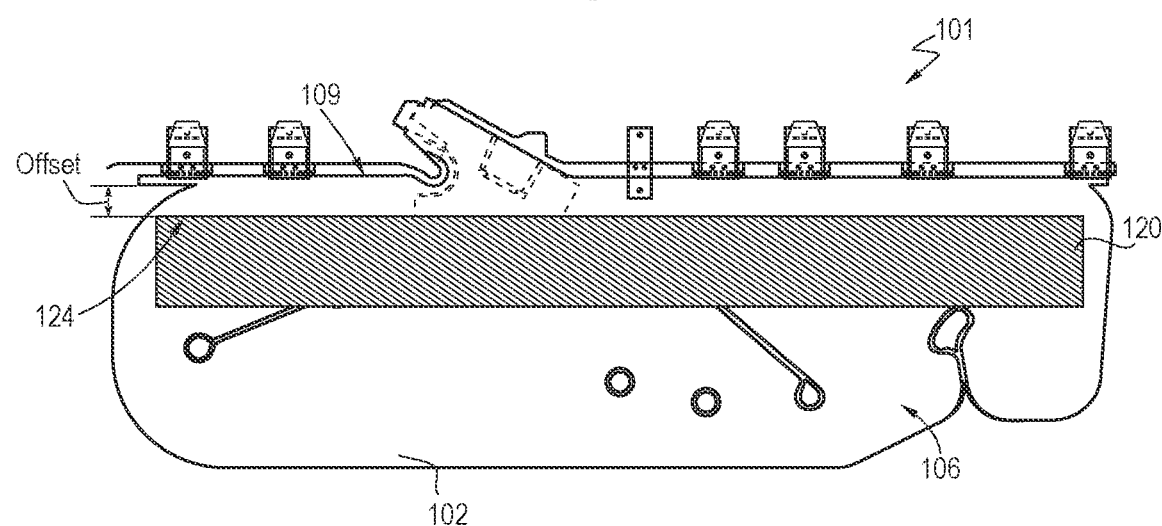
FIG. 7 is a side view of the inflatable curtain having the magnetized particle layer offset from an upper edge of the second fabric layer of FIG. 4.
Figure 7A:
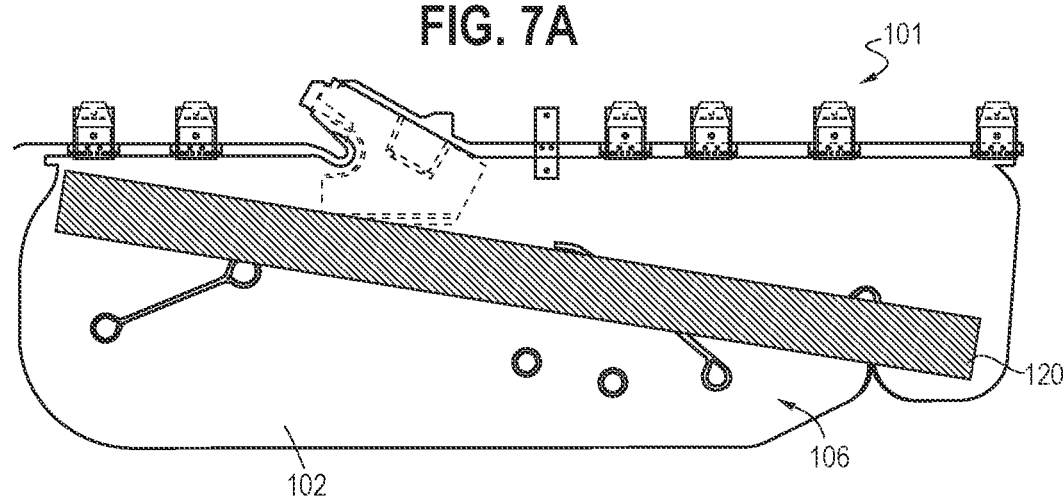
FIG. 7A is a side view of the inflatable curtain having the magnetized particle layer arranged in a diagonal pattern of FIG. 4.

FIG. 6A illustrates an end view of the inflatable curtain devices 400 in the undeployed condition along the roof rail 12 of the vehicle 10. For example, FIG. 6A shows the inflatable curtain device 400 in a folded configuration such as a Z-fold or pleat type. As shown in FIG. 6A, for example, the inflatable curtain 102 includes at least two permanent magnet regions 422 magnetized by the particle layers 120 and second regions having the opposite polarity. In the folded configuration of the inflatable curtain device 400 of FIG. 6A, the permanent magnet regions 422 having the polarity attract each other and hold the inflatable curtain 102 in the folded configuration. Accordingly, the inflatable curtain device 400 having the permanent magnet regions 422 maintains the folded configuration without the use of a separate wrapper or tape due to the inflatable curtain 102 magnetized by the particle layers 120. In addition, the attracted permanent magnet regions 422 in the folded configuration of the inflatable curtain device 400 provide a retention of the inflatable curtain 102 such that it prevents the inflatable curtain 102 from sagging in the installation position with the vehicle 10. In accordance with other embodiments of the present disclosure, the inflatable curtain 102 having at least two different permanent magnet regions 422 also maintains the rolled and/or folded configuration as shown in the example of FIGS. 4B and 4C.

Referring back to FIG. 4, the permanent magnet region 222 is defined adjacent to the upper portion 108 of the inflatable curtain 102 as a single continuous strip longitudinally along the roof rail 12 of the vehicle 10. In addition, in the deployed condition of the inflatable curtain 102, the particle layer 120 includes an upper particle edge 124 aligned with an upper edge 109 of the inflatable curtain 102 along the roof rail 12 of the vehicle 10. As shown in an example of FIG. 7, however, the upper particle edge 124 can be offset from the upper edge 109 of the inflatable curtain 102. As shown in FIGS. 7A-7D, furthermore, the particle layers 120 are attached to the first and/or second fabric layers 104 and 106 in regular or irregular patterns such as a diagonal pattern (FIG. 7A), a curving pattern (FIG. 7B), a tapered pattern (not shown), a series of polka dots (see FIG. 7C), and multiple geometric patterns (rectangular shape in FIG. 7D). In accordance with other embodiments of the present disclosure, the various patterns of the particle layers 120 above can be combined to magnetize the inflatable curtain 102 by attaching to the first and/or second fabric layers 104 and 106.

FIG. 8 illustrates a detailed cross-section of an inflatable curtain assembly 100 having each of the inflatable curtain devices 101, 200, 300, and 400 attached to the roof rail 12 of the vehicle 10. Each of the inflatable curtain devices 101, 200, 300, and 400 in the rolled and/or folded configuration is attached to the curtain attachment member 116 in the roof rail 12 when each of the inflatable curtain devices 101, 200, 300, and 400 are installed. In the installation position of the inflatable curtain devices 101, 200, 300, and 400, each of the permanent magnet regions 122, 222, 322, and 422 magnetized by the particle layers 120 is magnetically attracted to a second region 22 defined in the roof rail 12 of the vehicle 10 including the curtain attachment member 116. Accordingly, each of the attracted permanent magnet regions 122, 222, 322, and 422 of the inflatable curtain devices 101, 200, 300, and 400 provides a retention of the inflatable curtain 102 having the rolled and/or folded configuration in the installation position with the vehicle 10. As shown in FIG. 8, the curtain attachment member 116 included in the second region 22 extends from the roof rail 12 of the vehicle 10 and attracts each of the permanent magnet regions 122, 222, 322, and 422 of the inflatable curtain devices 101, 200, 300, and 400. As shown in the examples of FIGS. 3 and 4, the permanent magnet regions 122 and 222 located adjacent to the upper portion 108 of the inflatable curtain 102 are attracted to the second regions 22 of the vehicle 10. In the inflatable curtain assembly 100, the curtain attachment member 116 in the roof rail 12 of the vehicle 10 is generally formed of a ferrous material, which is attracted to the permanent magnet regions 122, 222, 322, and 422 of the inflatable curtains 102, respectively. Accordingly, each of the inflatable curtain devices 101, 200, 300, and 400 is retained to the interior of the vehicle 10 due to each of the permanent magnet regions 122, 222, 322, and 422 defined in the inflatable curtain 102 in the deployed condition and/or undeployed condition of the inflatable curtain 102.

While the above description constitutes the preferred embodiments of the present invention, it will be appreciated that the invention is susceptible to modification, variation and change without departing from the proper scope and fair meaning of the accompanying claims.

What is claimed is:

1. An inflatable curtain device for protecting occupants in a motor vehicle, the inflatable curtain device comprising:

an inflatable curtain adapted to be folded or rolled in an undeployed condition and inflated in a deployed condition, the inflatable curtain formed from at least a first and a second fabric layer, and at least one portion of one of the first and second fabric layers having a first permanent magnet region, a second region of the first or the second fabric layer positioned to attract the first permanent magnet region when the inflatable curtain is in a rolled or folded configuration, the first permanent magnet region attracted to the second region thereby providing a retention of the inflatable curtain in the rolled or folded configuration.

2. The inflatable curtain device of claim 1, wherein the first permanent magnet region on the inflatable curtain prevents the inflatable curtain from sagging in the undeployed condition such that the first permanent magnet region is configured to maintain the rolled or folded configuration of the inflatable curtain in an installation position with the vehicle.

3. The inflatable curtain device of claim 1, wherein the first permanent magnet region is formed by a particle layer having an upper particle edge arranged in a line with an upper edge of the inflatable curtain and a lower particle edge spaced from the upper particle edge.

4. The inflatable curtain device of claim 3, wherein the lower particle edge of the particle layer is arranged in a line with a lower edge of the inflatable curtain such that the entire surface of one of the first or second fabric layers of the inflatable curtain is fully covered by the first permanent magnet region.

5. The inflatable curtain device of claim 3, wherein the particle layer having the lower particle edge covers a part of a surface of one of the first and second fabric layers of the inflatable curtain, which defines a partly-covered area.

6. The inflatable curtain device of claim 5, wherein in a rolled configuration of the inflatable curtain, the first permanent magnet region defined as the partly-covered area is located in an outer-most layer and a couple of layers inwardly adjacent to the outer-most layer.

7. The inflatable curtain device of claim 5, wherein in a combined configuration of the inflatable curtain, the first permanent magnet region defined as the partly-covered area is located at a rolled portion enclosing a folded portion of the inflatable curtain.

8. The inflatable curtain device of claim 1, wherein the first permanent magnet region is formed by at least two particle layers separately attached to the at least one portion of one of the first and second fabric layers of the inflatable curtain.

9. The inflatable curtain device of claim 8, wherein in a folded configuration of the inflatable curtain, the first permanent magnet regions separately arranged in the one of the first and second fabric layers attracts each other for retaining the folded inflatable curtain.

* * * * *